Patented June 13, 1933

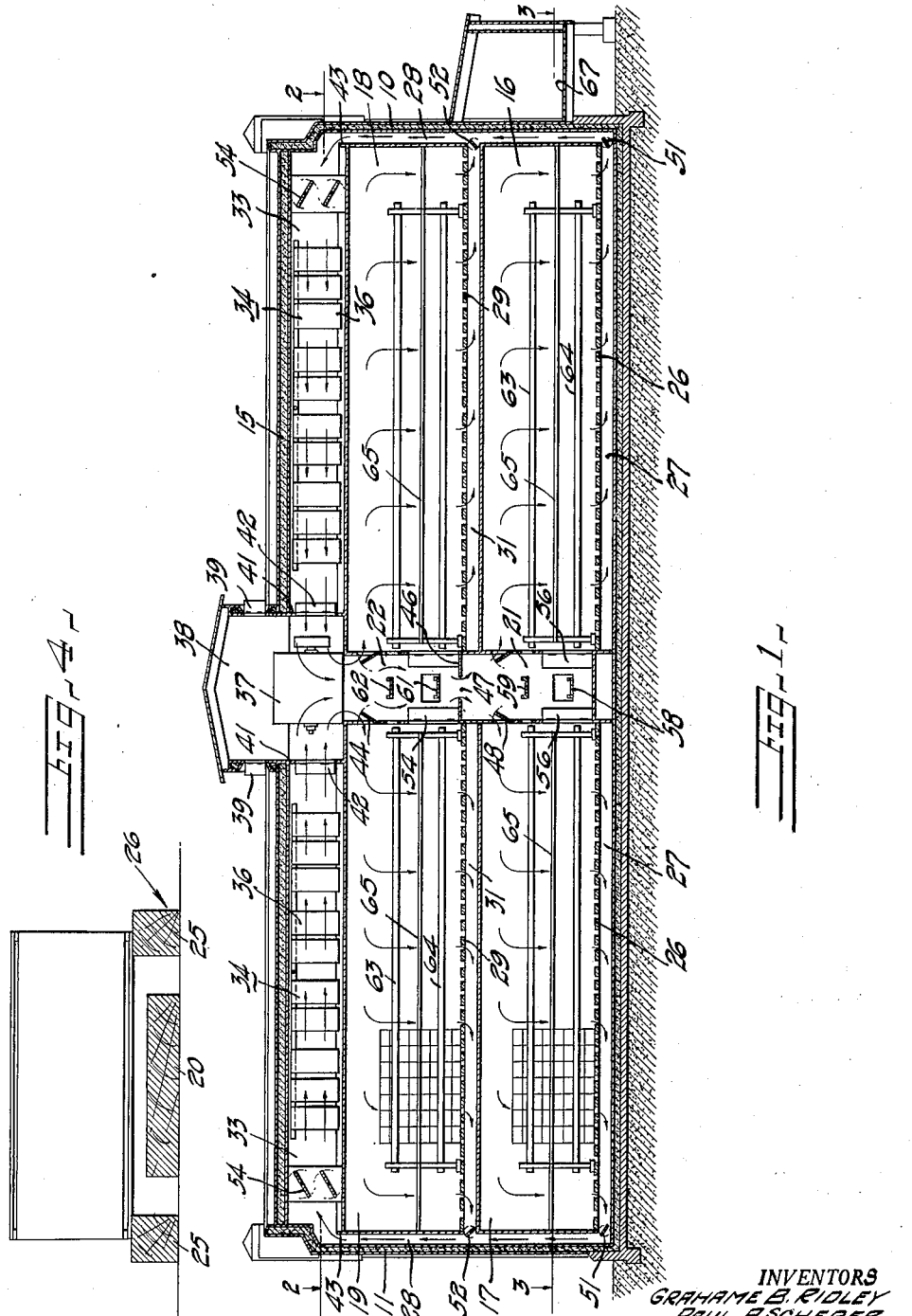

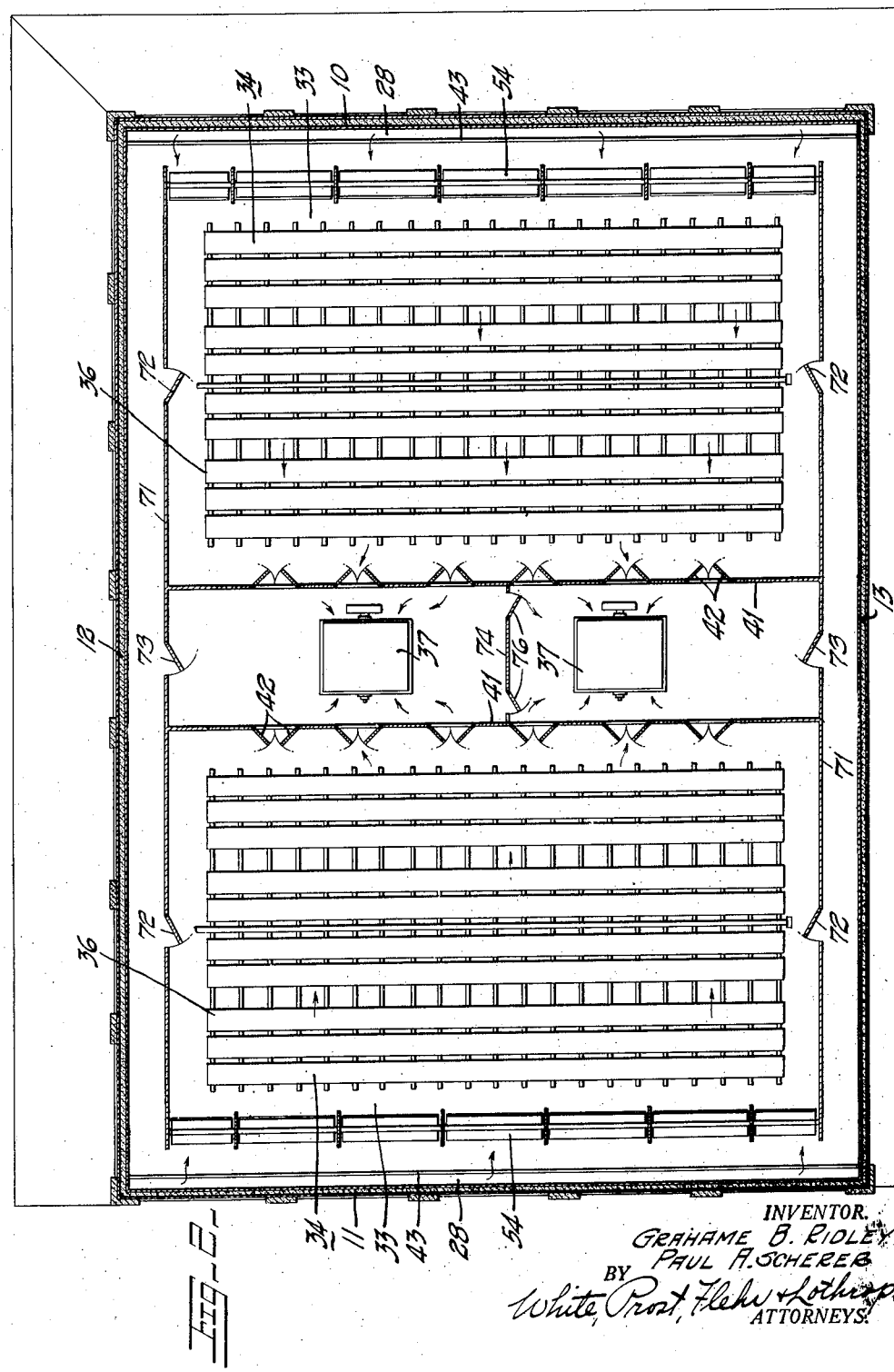

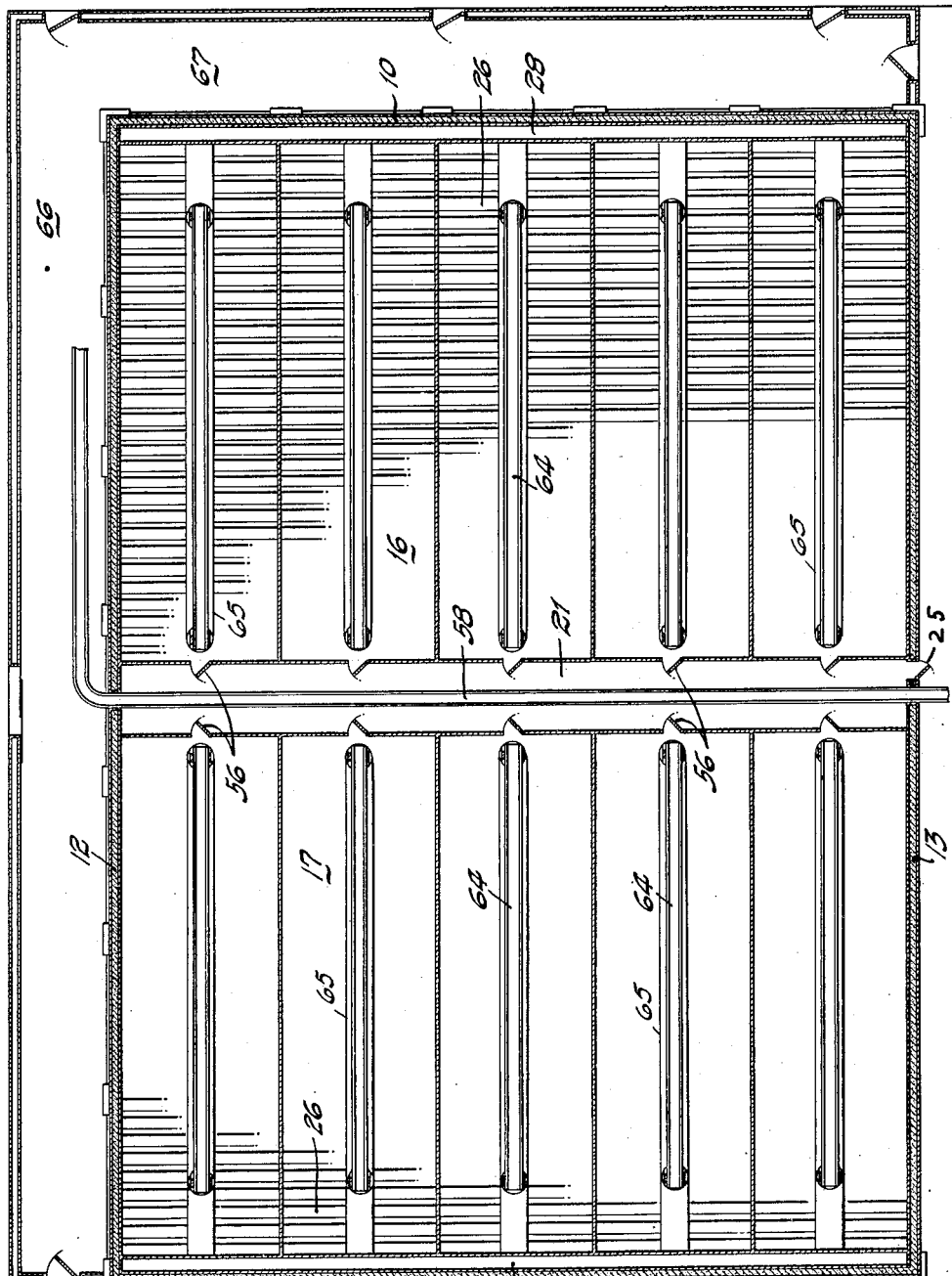

1,913,857

UNITED STATES PATENT OFFICE

PAUL A. SCHERER, OF MEDFORD, OREGON, AND GRAHAME B. RIDLEY, OF SAN FRANCISCO, CALIFORNIA, ASSIGNORS TO SOUTHERN OREGON SALES INC., OF MEDFORD, OREGON, A CORPORATION OF OREGON

REFRIGERATION PLANT

Application filed October 6, 1930. Serial No. 486,618.

This invention relates generally to refrigeration plants such as are utilized for the storing of perishable food products, as for example vegetables and fruits. It is of the general type in which cooled air or other suitable gas is brought into contact with the products being refrigerated.

It is an object of the invention to devise a refrigeration plant and method which will insure rapid chilling of products to a desired refrigeration temperature, and which will insure maintenance of the products within close limits of a desired temperature, irrespective of the introduction of unchilled products into the same refrigeration compartment.

It is a further object of the invention to devise a refrigeration plant characterized by comparatively high velocity of air thru the storage compartment, without excessive flow resistance and power consumption.

It is a further object of the invention to devise a refrigeration plant of relatively high efficiency, and which will be so constructed as to facilitate introduction and removal of products.

It is a further object of the invention to devise a refrigeration plant having a great flexibility of control, whereby the capacity of the plant can be readily adjusted to suit varying conditions, and whereby the refrigeration temperatures can be adjusted and maintained.

Further objects of the invention will appear from the following description in which the preferred embodiment of the invention has been set forth in detail. It is to be understood that the appended claims are to be accorded a range of equivalents consistent with the state of the prior art.

Referring to the drawings:

Figure 1 is a side elevational view of a building incorporating principles of the present invention, the building being shown in cross section.

Figure 2 is a cross sectional detail taken along the line 2—2 of Fig. 1.

Figure 3 is a cross sectional detail taken along the line 3—3 of Fig. 1.

Figure 4 is a cross sectional detail showing the construction of the floor boards for each storage compartment.

In refrigeration plants it has been common to store the products to be refrigerated within a suitable compartment through which cool air is circulated. Frequently a closed cycle is provided for the circulation of air, in which the air after contacting with the products is withdrawn from the compartment, cooled to a predetermined temperature by passing the same through a heat exchanger, and then reintroduced into the compartment. Generally the rate of flow of the cool air through the compartment is relatively low, being just sufficient to maintain the products near a desired refrigerating temperature. Such plants are subject to the objection that the products in different parts of the compartment may be maintained at substantially different temperatures. Furthermore upon introduction of unchilled products into the compartment together with products which have been previously chilled, a heat transfer is effected between the products either directly or through convection currents of air, thus causing temporary raising of the temperature of the previously chilled products to a detrimental degree. The manner in which these defects and disadvantages are overcome in the present invention will be presently pointed out. It is also characteristic of prior refrigeration plants that the products are not chilled at a relatively rapid rate. We have found that by rapid chilling of the products from atmospheric to a refrigeration temperature, particularly products such as fruit, the ultimate product will be preserved for a disproportionately longer period of time.

As will be pointed out in the following detailed description, the present invention is characterized by relatively rapid circulation of air through the refrigerating compartment with the result that the products being refrigerated are maintained at a more constant refrigeration temperature irrespective of the introduction of fresh products, and fresh poducts introduced into the storage compartment are chilled to refrigeration temperature in a relatively short period of time. The structure illustrated in the drawings making possible these results together with other advantages, consists of a building having the usual heat insulated side walls 10, 11, 12 and 13, a heat insulated floor, and an insulated top wall or roof 15. To provide for a relatively high storage capacity the particular building shown is of two story construction and has partitioned walls to form two series of lower storage compartments 16 and 17, and two series of upper storage compartments 18 and 19. The lower series of compartments 16 and 17 extend laterally from a corridor 21, while the series 18 and 19 extend laterally from a corridor 22, which is immediately above the corridor 21. These corridors 21 and 22 are conveniently accessible through doors 25 in one end of the building, and form convenient hallways or passages through the building through which products can be transported to and from the various storage compartments. Likewise as will be presently pointed out the corridors preferably perform the added function of conducting cool air to the compartments.

Each of the lower storage compartments is preferably formed with a foraminous floor 26, which can be formed of spaced floor boards 20 and 25 as shown in detail in Fig. 4. Immediately below each of the floors 26, there is an air duct 27 extending longitudinally of the compartment, and communicating at its outer end with a vertical air duct 28. The upper compartments are similarly formed with foraminous floors 29 and longitudinal air ducts 31, which communicate at their outer ends with the vertical air ducts 28.

Arranged over the upper compartments 18 and 19, are the air chambers 33, the sides of which communicate with the upper ends of the vertical air ducts 28. The ends of these compartments are defined by walls 71 which are provided with normally closed doors 72 and 73. The lower walls of these chambers 33 are formed by the ceilings of the compartments 18 and 19, while the upper walls are formed by the roof 15 of the building. Arranged within each of these chambers we provide a plurality of heat exchange units 34. These units are preferably of the type in which cold brine solution supplied to the same is brought into intimate contact with the air being cooled. Suitable heat exchange units of this type are disclosed in our copending application No. 463,542 filed June 24, 1930. It is sufficient at this time to explain that these units may consist of sheets 36 of canvas or other suitable absorbent material which are saturated by a continual supply of cold brine solution.

Above the upper corridor 22 we provide two fans or blowers 37 which are adapted to be driven by a suitable source of power, preferably independently. It is to be understood that one blower may suffice or more than two blowers can be utilized, depending upon the capacity of the plant. For convenience a suitable penthouse 38 is constructed over each blower, and these penthouses preferably have adjustable shutters 39 for a purpose which will be presently explained. The space occupied by blowers 37 is preferably divided by partition 74, which is provided with doors 76. This space is also segregated from chambers 33 by partitions 41, which are provided with adjustable shutters 42 for controlling flow of air through the same.

As previously pointed out, heat exchangers 34 are preferably of the brine contacting type to which cold brine solution is continually supplied when the plant is in operation. As the brine solution flows or drips from the sheets 36 it is collected upon the ceilings of compartments 18 and 19, which are provided with curbs 43 to collect the liquid so delivered. Suitable drain pipes communicating with compartments 18 and 19 serve to carry away this brine solution so that it can be recooled by suitable refrigeration apparatus and again delivered to heat exchange units 34.

When the blowers 37 are in operation they deliver air downwardly into the upper corridor 22, and from this corridor air is delivered through suitable adjustable shutters 44, into the upper portions of the compartments 18 and 19. The floor 46 separating the upper and lower corridors is also provided with longitudinal openings 47, permitting a certain amount of air delivered to corridor 22 to be delivered downwardly into corridor 21. From corridor 21 the air is delivered laterally into the upper portions of the lower storage compartments 16 and 17, through suitable adjustable shutters 48. At the same time a flow of air occurs to the intakes of blowers 37, through horizontal ducts 27 and 31, vertical ducts 28, chambers 33, and through shutters 42. In flowing through chambers 33, the air is cooled before being delivered to the blowers. Since air flowing through the circulation cycle thereby established flows at a relatively rapid rate, it is injected into each compartment through shutters 48 with sufficient velocity to produce a cool draft of air over the upper portion of the compartment and over the products being stored. The outflow of air through each horizontal duct 27 or 31 causes the air within each compartment to be drawn downwardly through the corresponding foraminous compartment floor in the direction shown by the arrows in Fig. 1. Thus by this method of delivering cool air and removing air from the compartments, all of the air within the compartments is continually flowing at a relatively high rate, and the change of air in different parts of the compartments is substantially uniform.

As has been previously explained it has been common in the past to continually circulate cooled air through a cold storage compartment, but primarily for the purpose of merely withdrawing just sufficient heat to maintain the products approximately at a refrigeration temperature. In the present invention we prefer to operate our plant in such a manner that the number of complete changes of air in each compartment is at least 0.5 times or more per minute, which is obviously a relatively high rate compared to that of prior systems. Such a relatively high rate of change together with down flow of air through the stored products produces certain important new results as has been previously indicated. In the first place products placed within the compartments and which are at ordinary atmospheric temperatures, are rapidly chilled to a refrigeration temperature. Thus the metabolism rate of the fruit which is relatively high at atmospheric temperatures, is quickly reduced to a minimum. We have found that food products such as fruit quickly chilled in this manner will keep in good condition for a relatively longer period than fruit slowly chilled in prior refrigeration plants. Furthermore more mature fruit or vegetable products can be refrigerated, thus increasing the quality of the products as finally marketed. The rapid flow of air into contact with the fruit or other food products serves to carry away any moisture which may be present or which may collect upon the surfaces of the product. Another advantageous result is that products which have been previously chilled and which are stored within a compartment will maintain their proper temperature within close limits irrespective of the introduction of relatively warm unchilled products into the compartment. In other words assuming that a compartment contains chilled products which are being maintained at a given temperature and that additional products at atmospheric temperature are then introduced into the compartment, the fresh products are quickly chilled by a direct exchange of heat with the cool air and not by an exchange of heat between the unchilled products and the previously chilled products. It will be appreciated that in order to properly preserve products such as fruit, their temperature while in storage should be maintained between relatively close limits. It should be noted that this last mentioned result is also attained in part thru the use of down-flowing currents of air which move with sufficient velocity to prevent lateral convection currents.

In order to facilitate control of circulation of air through the various storage compartments, dampers 51 are shown for adjustably controlling flow of air from horizontal ducts 27 into the vertical air ducts 28. Likewise suitable adjustable dampers 52 control flow of air from the upper horizontal ducts 31. To provide for better distribution of air to the heat exchangers 34, adjustable shutters 54 can be provided near the upper ends of vertical ducts 28. It is evident that by controlling any one of the shutters 51 or 52, together with proper control of the shutters 44 and 48, the air can be uniformly distributed through the storage compartments, and if desired any one compartment can be shut off from the air circulation. Likewise by controlling shutters 42 the rate of circulation as a whole through all of the compartments can be regulated. If desired all of the storage compartments of one side of the corridors 21 and 22 can be shut off from the air circulation, as for example by closing shutters 42 and also shutters 44 and 48. In running the plant at reduced capacity it is possible to operate only one of the blowers 37 by closing the shutters 42 leading to the other blower.

If all of the compartments on one side of the corridors are not in use, it is possible to employ either heat exchange means 34 for cooling the air. For example by closing shutters 44 and 54 on the right hand side of the building as viewed in Figs. 1 and 2, air being withdrawn from the right hand compartment is by-passed around walls 71 and into the compartment 33 on the left hand side of the building.

In many instances it may happen that the temperature of the exterior atmosphere is practically the same temperature as that desired for the air within the compartment. If this should occur by opening shutters 39 of the penthouses 38, and by operating one of the blowers, fresh exterior air can be circulated through the compartments. During such operation, if the external air is sufficiently cool, shutters 42 and 54 can be closed, and doors 73 leading to the inoperative blower are opened. The air then flows into one penthouse and out the other.

In introducing and removing stored products from the compartments, the products can be conveniently transported through the corridors 21 and 22, as these corridors have ready access to all of the compartments through convenient doors 56 and 57. In many instances in place of transporting the products manually it is convenient to provide roller or endless belt conveyors 58, 59, 61 and 62. extending longitudinally of the corridors 21 and 22. Conveyors 59 and 62 can serve as loading conveyors serving to convey products to be stored into the compartments through the corridors 21 and 22 in one direction. Suitable roller conveyors 63 and 64 are shown extending centrally of each storage compartment and are superposed to occupy a minimum of space. A suitable horizontal wall 65 is interposed between conveyors 63 and 64. By means of suitable detachable conveyor sections, products being transported along one of these loading conveyors, say conveyor 62, can be switched from this conveyor to the lower conveyor 64 of one of the storage compartments. After the products have been removed from conveyor 64 and into the compartment to a given height, the products from conveyor 62 can be switched to the upper conveyor 63 to permit stacking of products to a greater height. It is to be understood that in storing products within each compartment ample space is left between the top of the products and the ceiling of the compartment, to provide for passage of cool air. In removing products from a given storage compartment, say one of the upper compartments 18 or 19, the products if stacked at a relatively high level are first placed upon the upper conveyor 63 and this conveyor is then put into communication with the unloading conveyor 61 by a suitable conveyor section. When a sufficient amount of products have been removed from the compartment to lower the level below conveyor 63, the products can be placed upon conveyor 64, which is then placed in communication with unloading conveyor 61 through a suitable conveyor section. When a given compartment is completely filled with products, it is of course evident that an aisle is left through the center of the compartment through which the conveyors 63 and 64 extend, although downward flow of air through this aisle is blocked by wall 65. In storing products such as fruit, the fruit is preferably packed in suitable crates which are then stacked in tiers within the storage compartments. The positioning of the crates upon the floor boards is shown in Fig. 4. Assuming that a compartment is filled with crates stacked in this manner, it is evident that the cool air being introduced into the compartment flows over top of the crates and downwardly uniformly throughout the compartments through the tiers, and out through the floor of the compartment. In case a particular compartment has unoccupied floor space, such space is covered by canvas or other suitable means to force the air to flow down thru the stored products. The loading conveyors 59 and 62 of course extend through the wall at one end of the building to a point where the products to be stored are received. The unloading conveyors 59 and 61 can extend through the other end of the corridor to deliver the products to suitable loading platforms 66 and 67. From these loading platforms the products can be placed immediately in suitable refrigerator cars for shipment. Loading platforms 66 and 67 are preferably enclosed and insulated to prevent undue heating of the fruit while in transit to the refrigerator cars.

In actual typical operations, assuming twenty storage compartments such as shown, each having a space of 12,960 cubic feet, during normal operation with all of the compartments empty and connected with the circulating system, the air of each compartment will be changed completely about once every two minutes. If all of the compartments except one are cut off from the circulation of air, and that one compartment is empty, about 10 changes per minute will be effected. If all compartments are filled with products and all are connected with the air circulation, the air in each compartment will be completely changed about 2.5 times per minute. Assuming that only 6 compartments are filled with products and that the other compartments are cut off from the circulation, the air in each compartment will be changed about 8 times per minute. Thus in the above examples of typical operation the air passing through any one compartment always has considerable velocity, so that its sweeping action over and down through the products precludes the possibility of a direct exchange of heat between products through convection currents of air. The circulation path for air flow presents a minimum of flow resistance, thus enabling high velocities at a minimum of power consumption. Because the ducts 28 and 31 extend the full width of each compartment, the compartments are heat insulated by the surrounding currents of air.

We claim:

1. In a refrigeration plant, a storage compartment having a foraminous floor, an air duct formed below said floor through which air from the compartment can be removed, a corridor formed adjacent one end of the compartment and having access to the compartment for transfer of products, and means utilizing said corridor as an air duct for introducing cool air into the compartment.

2. In a refrigeration plant, a corridor through which products can be transported, a series of compartments extending laterally with respect to said corridor and having communication with the same, a blower located above said corridor, said blower serving to deliver air to the corridor, ducts serving to establish communication between the intake of the blower and each of said compartments, and means for cooling the air thereby circulated by the blower.

3. In a refrigeration plant, a corridor through which products can be transported, a series of compartments extending laterally to said corridor and having communication to the same, a heat exchanger located above said compartment, and a blower located above the corridor and adapted to draw air from the compartment and contact the same with the heat exchanger, the outflow side of the blower being arranged to discharge cool air into the corridor.

4. In a refrigeration plant, a plurality of corridors arranged one above the other, said corridors serving to permit transporting of food products to the same, a series of storage compartments extending laterally from these corridors, blowers arranged above the upper corridor and arranged to discharge air downwardly into the same, the upper corridor having communication with the lower corridor, ducts serving to convey air from the compartments to the inflow side of the blower, and a heat exchanger located above the upper storage compartments and serving to cool the air thereby circulated.

5. In a refrigeration plant, a pair of storage compartments disposed one above the other, a heat exchanger located above the uppermost compartment for cooling air which passes in a closed cycle through both of the compartments, means for directing the cooled air from the heat exchanger into the uppermost part of each of the compartments and downwardly through the space within each compartment, thence through the floor of each compartment and upwardly in heat transferring relationship with certain outer walls of each compartment and back to the heat exchanger, whereby the travel of the air is downward when it is most dense and is upward when it is least dense, and whereby the air in its upward travel serves to heat insulate the compartments from the outer atmosphere.

PAUL A. SCHERER.
GRAHAME B. RIDLEY.